United States Patent
Jindal et al.

(10) Patent No.: US 10,691,884 B2
(45) Date of Patent: Jun. 23, 2020

(54) SYSTEM AND METHOD FOR CHEQUE IMAGE DATA MASKING USING DATA FILE AND TEMPLATE CHEQUE IMAGE

(71) Applicant: Tata Consultancy Services Limited, Mumbai (IN)

(72) Inventors: Arun Kumar Jindal, Gurgaon (IN); Srinivasa Rao Chalamala, Hyderabad (IN); Ajeet Kumar Singh, Pune (IN); Vijayanand Mahadeo Banahatti, Pune (IN); Sachin Premsukh Lodha, Pune (IN); Sumit Johri, Pune (IN); Mayur Jain, Pune (IN); Nandita Babu, Pune (IN); Nikhil Girish Patwardhan, Pune (IN); Ashim Roy, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/467,852

(22) Filed: Mar. 23, 2017

(65) Prior Publication Data
US 2018/0113849 A1    Apr. 26, 2018

(30) Foreign Application Priority Data
Oct. 25, 2016    (IN) .............................. 201621036554

(51) Int. Cl.
| | | |
|---|---|---|
| H03H 17/00 | (2006.01) | |
| H03M 7/30 | (2006.01) | |
| G06F 40/186 | (2020.01) | |
| G06F 21/62 | (2013.01) | |
| G06F 40/174 | (2020.01) | |
| G06Q 20/04 | (2012.01) | |

(52) U.S. Cl.
CPC ........ *G06F 40/186* (2020.01); *G06F 21/6245* (2013.01); *G06F 21/6254* (2013.01); *G06F 40/174* (2020.01); *G06Q 20/042* (2013.01)

(58) Field of Classification Search
CPC .... G06F 17/248; G06F 17/243; G06Q 20/042
USPC ......................................................... 715/226
See application file for complete search history.

(56) References Cited

U.S. PATENT DOCUMENTS

| | | | |
|---|---|---|---|
| 7,805,673 B2 | 9/2010 | der Quaeler et al. | |
| 8,238,638 B2 * | 8/2012 | Mueller ................ | G06K 9/036 382/137 |

(Continued)

*Primary Examiner* — Cesar B Paula
*Assistant Examiner* — Luu-Phuong T Nguyen
(74) *Attorney, Agent, or Firm* — Finnegan, Henderson, Farabow, Garrett & Dunner LLP (57) ABSTRACT

System and method for cheque image data masking are disclosed. In an example, a cheque image and a data file are received, the data file includes data records with values corresponding to sensitive data fields in the cheque image. Further, a template cheque image matching to the cheque image and redacted information associated with the template cheque image are obtained. Furthermore, a blank image snippet is generated for each sensitive data field in the cheque image based on a part of the obtained information about sensitive fields. Moreover, values corresponding to each sensitive field from the input data file are written to the blank image snippet based on the remaining information about sensitive fields. Also, the template cheque image is updated with the image snippet. Data of non-sensitive fields in the cheque image is then copied to the template cheque image, thereby facilitating cheque image data masking.

9 Claims, 6 Drawing Sheets

(56) References Cited

U.S. PATENT DOCUMENTS

| | | | |
|---|---|---|---|
| 8,938,671 B2 | 1/2015 | Eisen et al. | |
| 9,489,354 B1 | 11/2016 | Lee et al. | |
| 9,824,288 B1* | 11/2017 | Hall | G06K 9/00469 |
| 2004/0205286 A1* | 10/2004 | Bryant | H04N 5/772 |
| | | | 711/1 |
| 2005/0182667 A1* | 8/2005 | Metzger | G06Q 50/24 |
| | | | 705/4 |
| 2008/0130998 A1* | 6/2008 | Maidment | G06K 9/4652 |
| | | | 382/181 |
| 2012/0033892 A1 | 2/2012 | Blenkhorn et al. | |
| 2013/0182002 A1* | 7/2013 | Macciola | H04N 1/387 |
| | | | 345/589 |
| 2014/0123303 A1* | 5/2014 | Shukla | G06F 21/6254 |
| | | | 726/26 |
| 2014/0233832 A1* | 8/2014 | Bennett | G06K 9/00469 |
| | | | 382/137 |
| 2014/0280517 A1* | 9/2014 | White | H04L 67/04 |
| | | | 709/203 |
| 2015/0081681 A1* | 3/2015 | Vohra | G06F 7/24 |
| | | | 707/723 |
| 2015/0371613 A1* | 12/2015 | Patel | G06F 21/10 |
| | | | 345/549 |
| 2017/0076114 A1* | 3/2017 | Rai | G06F 21/6254 |
| 2017/0323173 A1* | 11/2017 | Hall | G06K 9/00469 |

\* cited by examiner

SYSTEM AND METHOD FOR CHEQUE IMAGE DATA MASKING USING DATA FILE AND TEMPLATE CHEQUE IMAGE

PRIORITY CLAIM

This U.S. patent application claims priority under 35 U.S.C. § 119 to India Application No. 201621036554, filed on Oct. 25, 2016. The entire contents of the aforementioned application are incorporated herein by reference.

TECHNICAL FIELD

The embodiments herein generally relate to masking and, more particularly, to cheque image data masking.

BACKGROUND

Generally, cheque images include data which is non-public information. For example, the non-public information include customer name, address, account number, signature and so on. While processing such cheque images, the non-public information is accessible to all systems or humans involved in the processing. Thus, leading to privacy violations. For example, banking institutions often use cheque images for testing new bank applications or for performing regressing testing in a bank environment. Use of such cheque images containing the non-public information leads to flagging of audit issues.

SUMMARY

Embodiments of the present disclosure present technological improvements as solutions to one or more of the above-mentioned technical problems recognized by the inventors in conventional systems. In view of the foregoing, embodiments herein provide a system and method for cheque image data masking.

In view of the foregoing, an embodiment herein provides methods and systems for cheque image data masking are disclosed. In one embodiment, a processor-implemented method includes steps of: receiving, by one or more hardware processors, a cheque image and a data file, wherein the data file comprises data records with values corresponding to sensitive data fields in the cheque image; obtaining, by the one or more hardware processors, a template cheque image matching to the cheque image and redacted information associated with the template cheque image, wherein the redaction information comprises metadata information and information about sensitive fields; generating, by the one or more hardware processors, a blank image snippet for each of the sensitive data fields in the cheque image based on at least a part of the obtained information about sensitive fields; writing, by the one or more hardware processors, values corresponding to each of the sensitive fields from the data file to the blank image snippet based on the remaining obtained information about sensitive fields; updating, by the one or more hardware processors, the template cheque image with the image snippet; and copying, by the one or more hardware processors, data of non-sensitive fields in the cheque image to the template cheque image, thereby facilitating cheque image data masking.

In another embodiment, a system for cheque image data masking is disclosed. The system includes one or more memories; and one or more hardware processors, the one or more memories coupled to the one or more hardware processors, wherein the one or more hardware processors are capable of executing programmed instructions stored in the one or more memories to: receive a cheque image and a data file, wherein the data file comprises data records with values corresponding to sensitive data fields in the cheque image; obtain a template cheque image matching to the cheque image and redacted information associated with the template cheque image, wherein the redaction information comprises metadata information and information about sensitive fields; generate a blank image snippet for each of the sensitive data fields in the cheque image based on at least a part of the obtained information about sensitive fields; write values corresponding to each of the sensitive fields from the data file to the blank image snippet based on the remaining obtained information about sensitive fields; update the template cheque image with the image snippet; and copy data of non-sensitive fields in the cheque image to the template cheque image, thereby facilitating cheque image data masking.

In yet another embodiment, a non-transitory computer-readable medium having embodied thereon a computer program for executing a method for cheque image data masking. The method includes steps of: receiving, by one or more hardware processors, a cheque image and a data file, wherein the data file comprises data records with values corresponding to sensitive data fields in the cheque image; obtaining, by the one or more hardware processors, a template cheque image matching to the cheque image and redacted information associated with the template cheque image, wherein the redaction information comprises metadata information and information about sensitive fields; generating, by the one or more hardware processors, a blank image snippet for each of the sensitive data fields in the cheque image based on at least a part of the obtained information about sensitive fields; writing, by the one or more hardware processors, values corresponding to each of the sensitive fields from the data file to the blank image snippet based on the remaining obtained information about sensitive fields; updating, by the one or more hardware processors, the template cheque image with the image snippet; and copying, by the one or more hardware processors, data of non-sensitive fields in the cheque image to the template cheque image, thereby facilitating cheque image data masking.

It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The terms "cheque image template" and "template cheque image" are used interchangeably throughout the document.

The present technique performs data masking of cheque (check) images. In an embodiment, the technique learns about the metadata associated with various standard cheque images. It locates the sensitive data fields (Region, of Interest) in the cheque images, learns the attributes and also generates the template cheque images corresponding to each standard cheque image. Further, the present technique receives cheque image which needs to be masked and data file as inputs. The technique then computes the similarity of the input cheque image with the generated template cheque images. On finding the matching template cheque image, it retrieves the associated metadata and the masking information associated with all the sensitive data fields on the cheque image. Based on the masking information, the technique generates image snippets of the same dimension and attributes as that of the sensitive data fields using the content in the input data file. These image snippets are then used to generate one or more masked cheque images.

The methods and systems are not limited to the specific embodiments described herein. In addition, the method and system can be practiced independently and separately from other modules and methods described herein. Each device element/module and method can be used in combination with other elements/modules and other methods.

Figure 1:
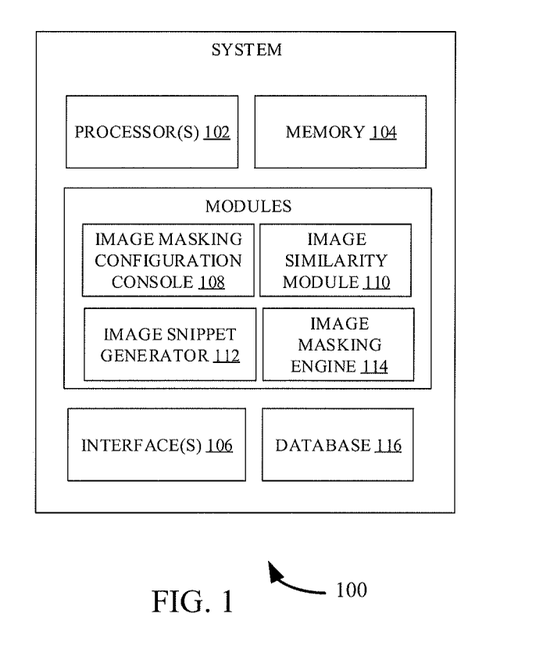
FIG. 1 illustrates a system for cheque image data masking, according to an embodiment of a present subject matter.
Figure 2A:
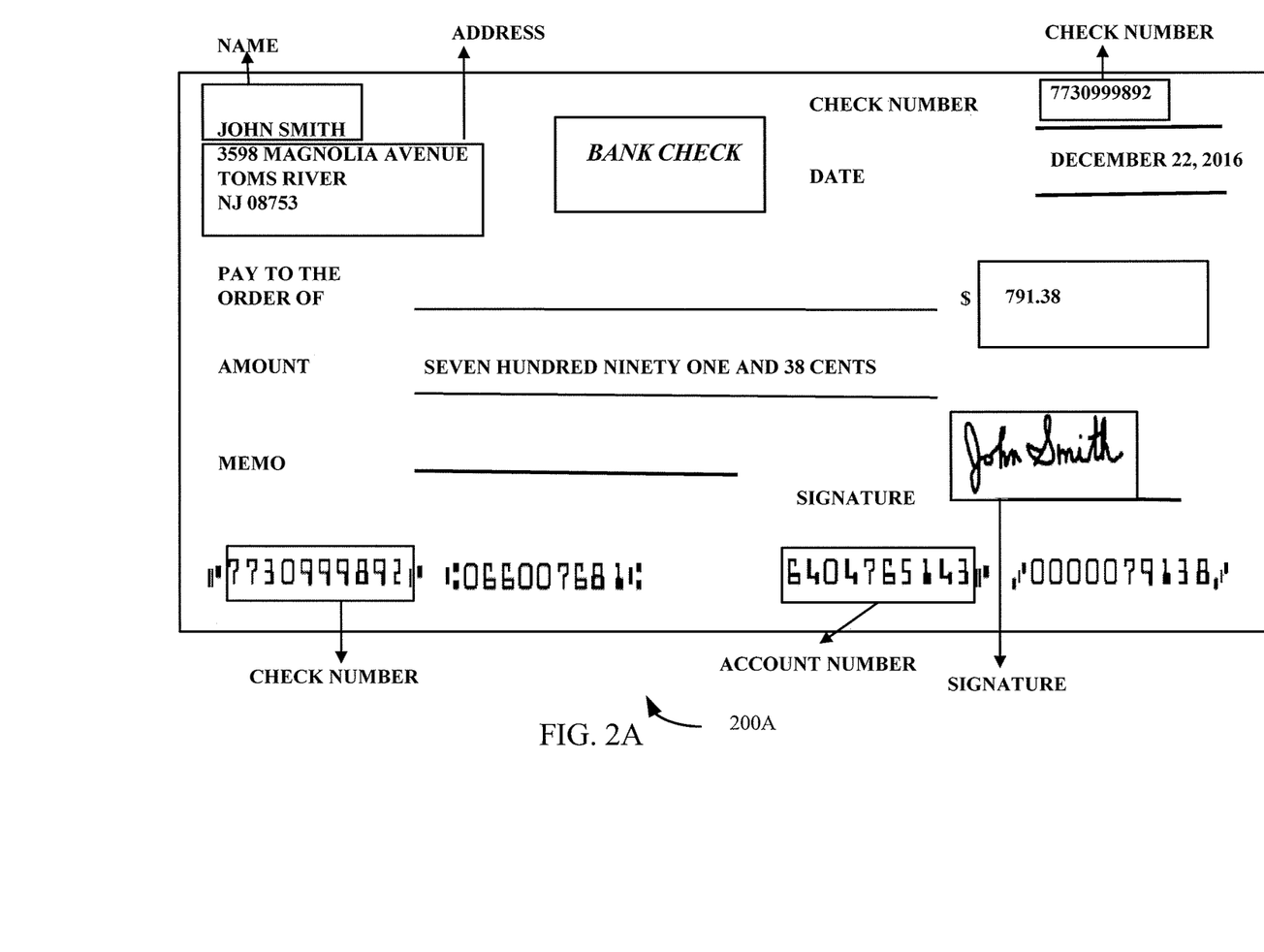
FIGS. 2A and 2B illustrate standard cheque images, according to an embodiment of a present subject matter.
Figure 2B:
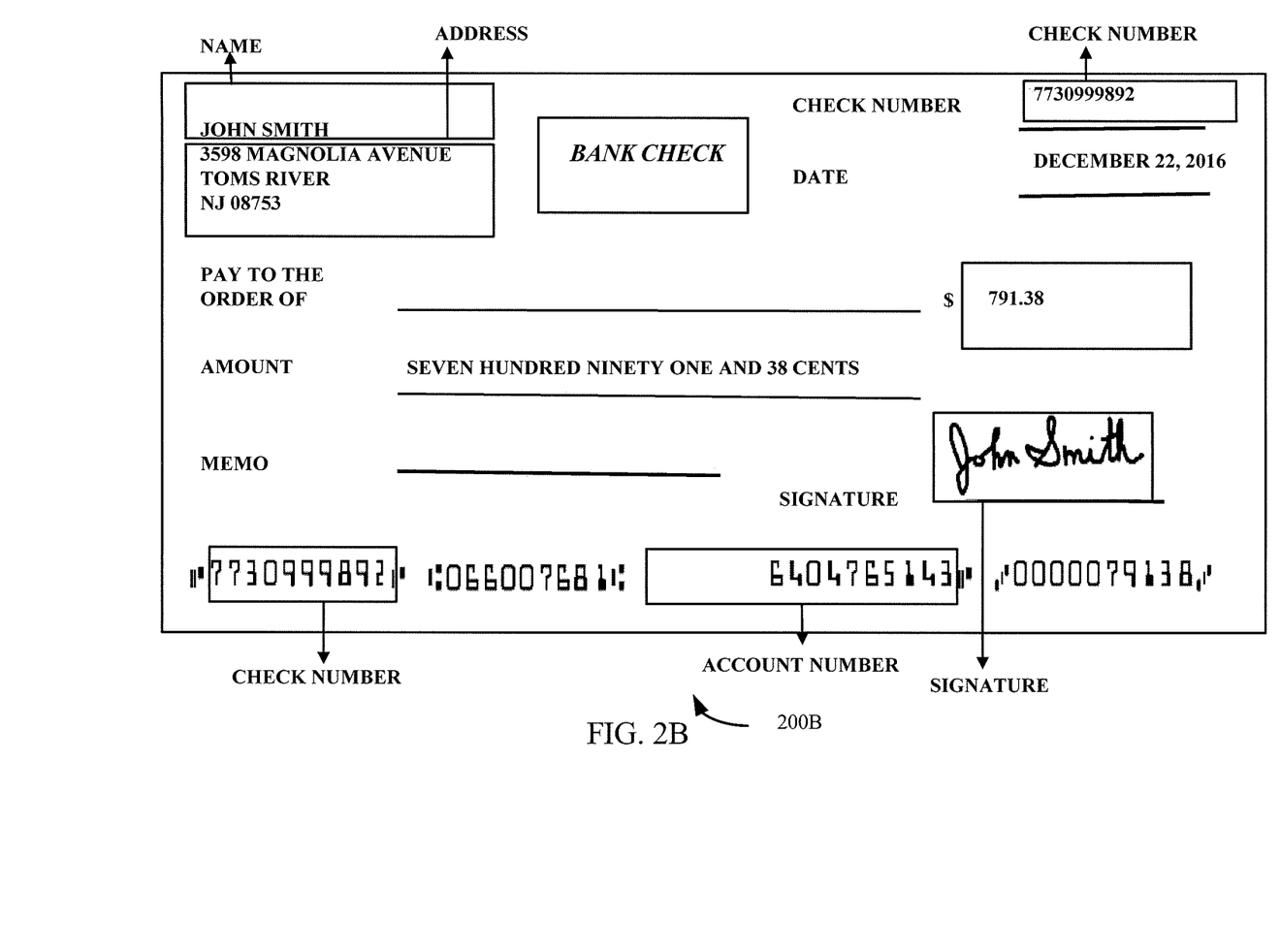
Figure 2C:
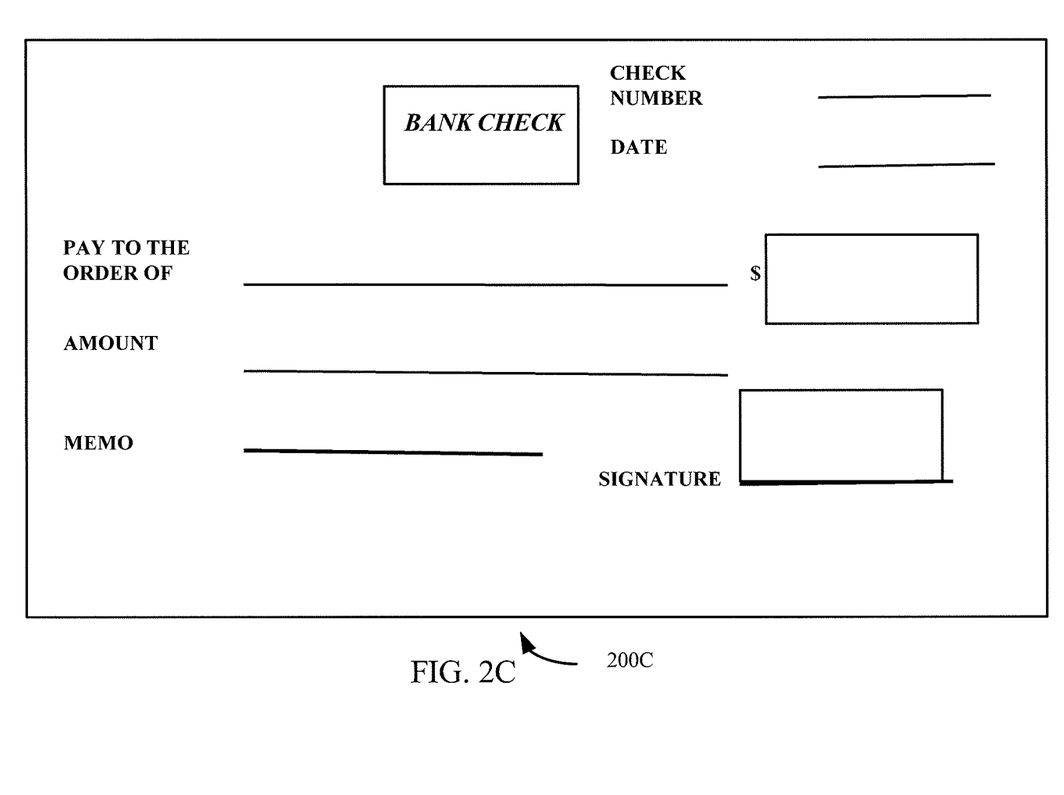
FIG. 2C illustrates a cheque image template, according to an embodiment of a present subject matter.
Figure 3:
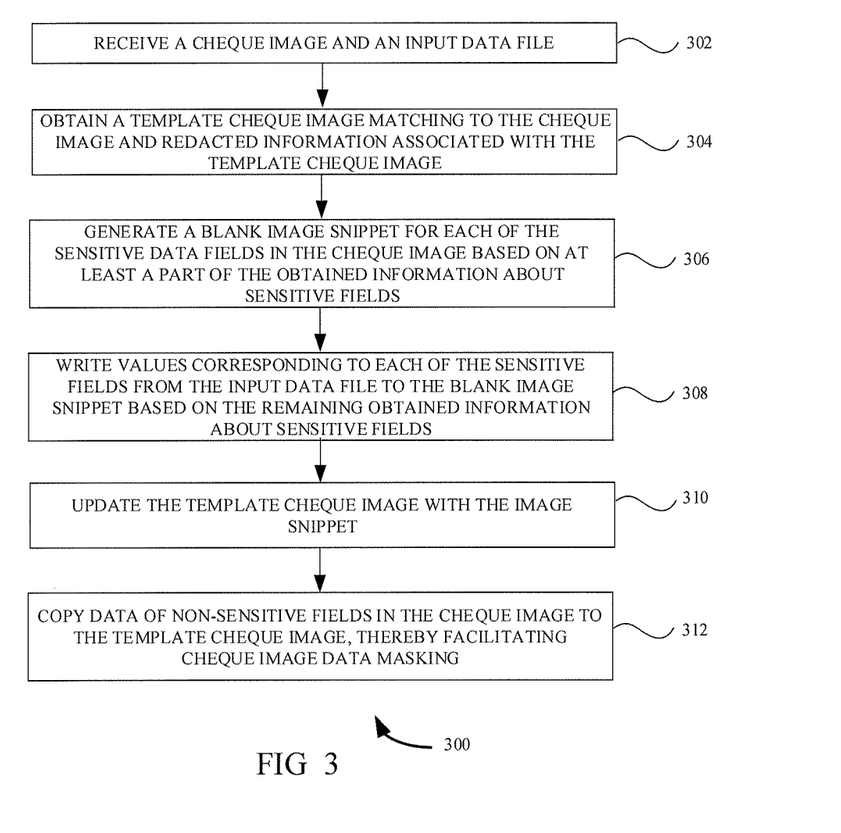
FIG. 3 is a flowchart illustrating a method for cheque image data masking, according to an embodiment of a present subject matter.

The manner, in which the system and method for cheque image data masking, has been explained in details with respect to the FIGS. 1 through 3. While aspects of described methods and systems for cheque image data masking can be implemented in any number of different systems, utility environments, and/or configurations, the embodiments are described in the context of the following exemplary system (s).

FIG. 1 illustrates a block diagram of a system 100 for cheque image data masking, in accordance with an example embodiment. In an example embodiment, the system 100 may be embodied in, or is in direct communication with a computing device. The system 100 includes or is otherwise in communication with one or more hardware processors such as processor(s) 102, one or more memories such as a memory 104, and a network interface unit such as a network interface unit 106. In an embodiment, the processor 102, memory 104, and the network interface unit 106 may be coupled by a system bus such as a system bus or a similar mechanism. Although FIG. 1 shows example components of the system 100, in other implementations, the system 100 may contain fewer components, additional components, different components, or differently arranged components than depicted in FIG. 1.

The processor 102 may include circuitry implementing, among others, audio and logic functions associated with the communication, and imaging, displaying, decoding and rendering functions. For example, the processor 102 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. The processor 102 thus may also include the functionality to encode messages and/or data or information. The processor 102 may include, among other things, a clock, an arithmetic logic unit (ALU) and logic gates configured to support operation of the processor 102. Further, the processor 102 may include functionality to execute one or more software programs, which may be stored in the memory 104 or otherwise accessible to the processor 102.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation DSP hardware, network processor, application specific integrated circuit (ASIC), FPGA, read only memory (ROM) for storing software, random access memory (RAM), and non-volatile storage. Other hardware, conventional, and/or custom, may also be included.

The interface(s) 106 may include a variety of software and hardware interfaces, for example, interfaces for peripheral device(s), such as a keyboard, a mouse, an external memory, and a printer. The interface(s) 106 can facilitate multiple communications within a wide variety of networks and protocol types, including wired networks, for example, local area network (LAN), cable, etc., and wireless networks, such as Wireless LAN (WLAN), cellular, or satellite.

The one or more memories such as a memory 104, may store any number of pieces of information, and data, used by the system to implement the functions of the system. The memory 104 may include for example, volatile memory and/or non-volatile memory. Examples of volatile memory may include, but are not limited to volatile random access memory. The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 104 may be configured to store information, data, applications, instructions or the like for enabling the system 100 to carry out various functions in accordance with various example embodiments. Additionally or alternatively, the memory 104 may be configured to store instructions which when executed by the processor 102 causes the system to behave in a manner as described in various embodiments. The memory 104 includes an image masking configuration console 108, an image similarity module 110, an image snippet generator 112, an image masking engine 114, a database 116 and/or other modules. The modules 108, 110, 112 and 114 include routines, programs, objects, components, data structures, etc., which perform particular tasks or implement particular abstract data types. The other modules may include programs or coded instructions that supplement applications and functions of the system 100.

In operation, the image masking configuration console 108 receives a plurality of standard or reference images. In an example, the image masking configuration console 108 receives a plurality of standard cheque images. Further, the image masking configuration console 108 retrieves masking or redaction information of each of the standard cheque images and then generates cheque image templates for each of the received standard cheque images upon retrieval. In this example, the image masking configuration console 108 allows the user to mark each sensitive field following which the masking/redaction information is retrieved. In an example, the image masking configuration console 108 identifies the sensitive fields in the received images. The image masking configuration console 108 can then identify the masking/redaction information. The masking/redaction information and cheque image templates of each of the received cheque images are then stored in the database 116. For example, the masking/redaction information includes metadata of the standard cheque images and information about regions of the cheque image containing non-public information. The non-public information includes various sensitive data fields, such as name, address, signature, account number etc. In this example, the masking/redaction information includes the following information:

A. Metadata of each of the standard cheque images:
  i. Memory space required by the cheque image,
  ii. Dimension,
  iii. Image file format type,
  iv. Compression scheme used to compress the cheque image,
  v. Type of the cheque image (e.g., binary image, gray scale image or colored image), and
  vi. Bit depth of the image (Number of bits per pixel used to represent the color intensity of the pixel).
B. Information about the sensitive data fields in the input standard cheque images.
  i. Co-ordinates of each of the data fields. In an example, two co-ordinate values, at the starting and endpoint of a diagonal from upper left to lower right (marked inside boxes, shown in an image 200A of FIG. 2A) are used to represent each sensitive data field. While determining the co-ordinates of the sensitive data field (also referred as a region of interest), it is the discretion of the system admin as to how the admin selects the region of the image containing sensitive data fields (i.e., region of interest). For example in FIG. 2A, the admin has selected the sensitive data field regions in such a way that it just bounds the sensitive data field regions in the cheque images. However, length of the data is limited which can be placed in the image region. For example, the address, cheque number, signature fields can occupy more space towards their right as shown in an image 200B of FIG. 2B.
  ii. Color used to represent each data field. For example, the color is represented by taking the mean of all the pixel values used to represent content in the data field.
  iii. Content of each sensitive data field extracted using Optical Character Recognition (OCR) readers.
  iv. Font used to represent each data field. For example, each character in the data field is segmented and machine learning algorithms are trained to recognize different fonts of each segment.
  v. Font size of each data field. Based on the number of pixels occupied (both horizontally and vertically) by each character in a data field, the font size used to represent the characters in the data field is estimated.
  vi. Overlapping foreground and background content. In an embodiment, the image masking configuration console 108 determines if there is an overlapping foreground and background content in the standard cheque image. The console 108 then segments the foreground and background content based on the difference in the pixel color and intensity values of the foreground and background content. The console 108 thereafter tries to establish if the segmented background content is a text/picture/logo etc. In some scenarios where there is no difference in the pixel color values of the foreground and background content, prior knowledge about the structural properties of the cheque images in combination with other image processing techniques are used to segment the overlapping background and foreground content.

In an example embodiment, given the standard cheque image, the console 108 retrieves the masking/redaction information and generates the corresponding cheque image template and then asks the admin for a signoff. In this example embodiment, the admin can intervene in case some masking/redaction information has been computed incorrectly or the cheque image template has not been generated properly. In another example embodiment, the admin is provided with an interactive console where the admin can input the masking/redaction information corresponding to the given standard cheque image. Example template cheque image 200C is shown in FIG. 2C. In these embodiments, the console 108 generates the cheque image template by removing all data (that has inputted like amount, date and so on) from the standard cheque image. For example, given a standard cheque image, the console 108 creates several variations of it for training. The variation includes resizing, rotation and the like. The console 108 then learns these images and generates template cheque images which can optimally match the standard cheque image using correlation.

Further in operation, the image similarity module 110 receives a cheque image which needs to be masked, fictitious data records (one or more) corresponding to different data fields in the cheque image or a database which is populated by automatic identification of sensitive fields (e.g., on through real-time computations of the locations). The data records may include privacy resilient information. The cheque image, data records and redaction information associated with the cheque image are stored in the database 116. Each record represents values for one or more sensitive data fields in the cheque image. In an example, the fictitious data records can be in a data file.

Furthermore, the image similarity module 110 obtains a template cheque image (e.g., template cheque image 200C) matching to the cheque image and redacted information associated with the template cheque image. In an example embodiment, the image similarity module 110 computes distance of the input cheque image with all the cheque image templates stored in the database 116. The image similarity module 110 then obtains the template cheque image that is matching to the cheque image based on the distance. In other example embodiment, the image similarity module 110 uses correlation filters to find the template cheque image that is matching to the cheque image. In this embodiment, given a cheque image, the image similarity module 110 correlates given cheque image with the templates generated and stored in the database 116. The correlation output is maximum if the both the cheque image and the template belongs to same set. The correlation output is negligible if the cheque image does not belong to the template cheque image set. Based on the correlation output, the image similarity module 110 finds a template cheque image matching to the cheque image. In other words, the image similarity module 110 helps in determining the template to which the input cheque image belongs and masking/redaction information associated with it. If a matching cheque image template is found, then the image similarity module 110 retrieves the matching cheque image template and the masking/redaction information corresponding to the matching cheque image template. If the image similarity module 110 does not find the matching document/cheque image template corresponding to the input document/cheque image, then it generates an alert message and redirects the image to the console 108. When the same cheque image comes as an input next time, the image similarity module 110 finds the matching cheque image template. The image similarity module 110 then sends the input data records and the retrieved masking/redaction information to the image snippet generator 112. Also, the image similarity module 110 sends the retrieved masking/redaction information and matching cheque image template to the image masking engine 114.

Moreover, the image snippet generator 112 receives the data records and the masking/redaction information. In an example, the image snippet generator 112 receives the data records and the masking/redaction information from the database 116. Further, image snippet generator 112 reads the masking/redaction information for each sensitive data field in the input cheque image. Further, the image snippet generator 112 generates a blank image snippet for each sensitive data field in the input cheque image based on at least a part of the masking/redaction information. In an embodiment, image snippet generator 112 generates the blank image snippet for each of the sensitive data fields in the cheque image based on the co-ordinate information. In some embodiments, the same cheque image can be used as base to mask sensitive fields.

Also, the image snippet generator 112 writes the values corresponding to each of the sensitive fields from the input data file to the blank image snippet based on the remaining obtained information about sensitive fields. In an example, the image snippet generator 112 retrieves the value for the particular sensitive data field from the input data records and writes the retrieved value onto the blank image snippet using the color, font, font size, bit depth information and overlapping foreground and background information. The image snippet generator 112 then send the image snippets corresponding to each sensitive data field in the input cheque image to the image masking engine 114. The image snippet generator 112 repeats the above process for each data record.

Also, the image masking engine 114 receives the cheque image, retrieved masking/redaction information, matching cheque image template and image snippets for each data record. Further, the image masking engine 114 updates the template cheque image with the image snippet. More particularly, the image masking engine 114 overwrites the received image snippets for each data field on the cheque image template. The image masking engine 114 overwrites the received image snippets for each data field on the cheque image template by updating the pixel values in the cheque image template to the pixel values in each image snippet. The image masking engine 114 thereafter copies data of non-sensitive data fields from the input cheque image to the cheque image template. In some scenarios, one or more masked images are generated based on the number of data records.

In some embodiments, the image masking engine 114 compares metadata information of the cheque image with the metadata information of the matching template cheque image. The image masking engine 114 then adjusts the template cheque image to resemble the cheque image when there are differences in the metadata information of the cheque image and the metadata information of the matching template cheque image. For example, if size of the template cheque image is different from the cheque image, then the image data masking engine 114 adjusts the size of the template cheque image to resemble the cheque image. Thus, the masked cheque image is generated which has the approximately the same size, dimension, file format, compression scheme, bit depth etc. as that of the input cheque image. In an example, the number of masked images are generated based on the number of data records.

FIG. 3 illustrates a flow diagram of a method 300 for cheque image data masking, in accordance with an example embodiment. The processor-implemented method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof. In an embodiment, the method 300 depicted in the flow chart may be executed by a system, for example, the system 100 of FIG. 1.

At block 302, a cheque image and a data file are received. For example, the data file including data records having values corresponding to sensitive data fields in the cheque image. At block 304, a template cheque image matching to the cheque image and redacted information associated with the template cheque image are obtained. In an embodiment, a distance between the cheque image and the templates cheque images is computed. The template cheque image matching to the cheque image is then obtained based on the computed distance. The redaction information includes metadata information and information about sensitive fields. For example, the information about the sensitive fields includes co-ordinates, color, font, content, font size, overlapping foreground and background content and the like.

At block 306, a blank image snippet is generated for each of the sensitive data fields in the cheque image based on at least a part of the obtained information about sensitive fields. In an embodiment, the blank image snippet for each of the sensitive data fields in the cheque image is generated based on the co-ordinate information. At block 308, values corresponding to each of the sensitive fields from the input data file are written to the blank image snippet based on the remaining obtained information about sensitive fields. In an example, the values corresponding to each of the sensitive fields from the input data file are written to the blank image snippet based on the information associated with color, font, content, font size, and overlapping foreground and background content.

At block 310, the template cheque image is updated with the image snippet. For example, pixel values in the template cheque image are updated to pixel values in the image snippet. At block 312, data of non-sensitive fields in the cheque image is copied to the template cheque image, thereby facilitating cheque image data masking. In an example embodiment, metadata information of the cheque image is compared with the metadata information of the matching template cheque image. Further, the template cheque image is adjusted to resemble the cheque image when there are differences in the metadata information of the cheque image and the metadata information of the matching template cheque image.

In some embodiments, a plurality of standard cheque images are received. Further, redaction information of each of the plurality of standard cheque images is received. Furthermore, template cheque images are generated for the plurality of standard cheque images.

Figure 4:
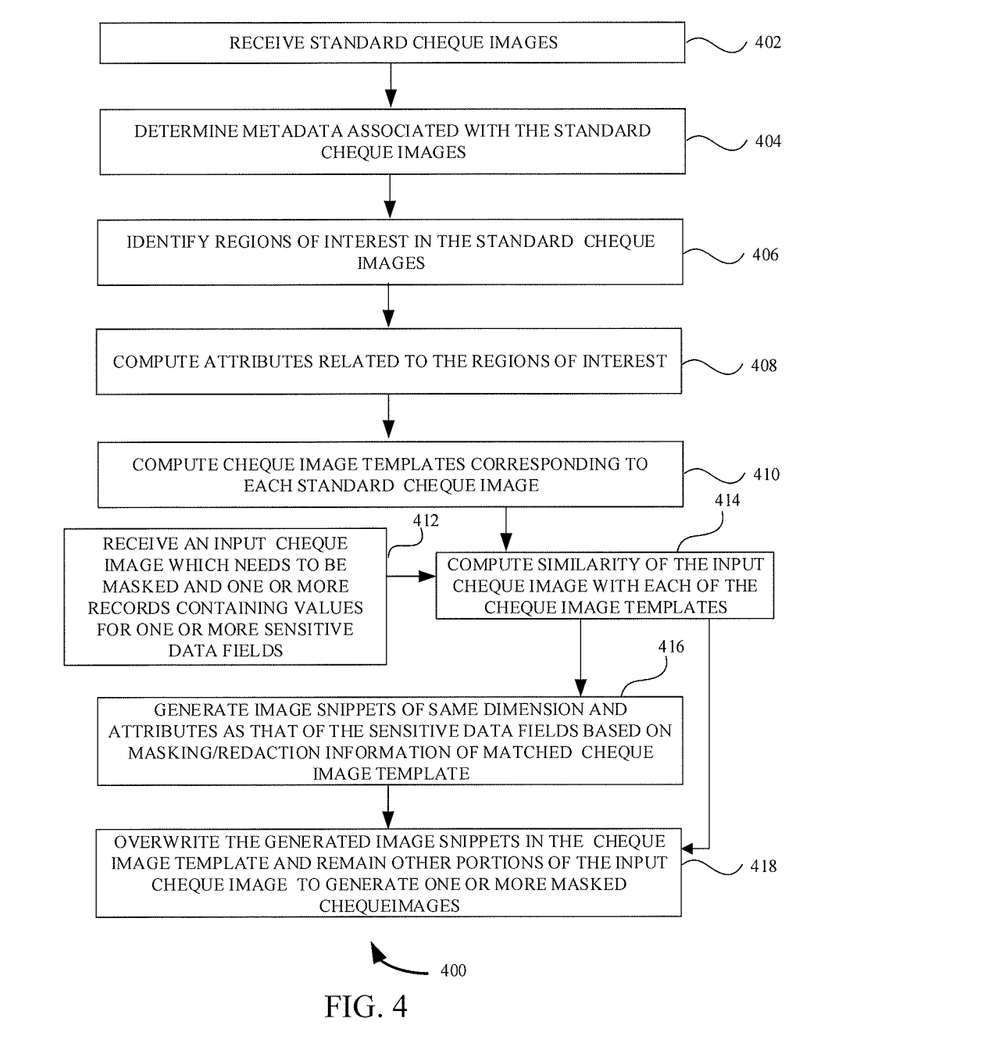
FIG. 4 is another flowchart illustrating a method for cheque image data masking, according to an embodiment of a present subject matter.

FIG. 4 is another flowchart 400 illustrating a method for cheque image data masking, according to an embodiment of a present subject matter. At block 402, standard cheque images are received. At block 404, metadata (e.g., size, dimensions, file format, compression scheme, bit depth and so on) associated with the standard cheque images is determined. At block 406, regions of interest (i.e., sensitive data fields) in the cheque images are identified. At block 408, attributes related to the regions of interest, such as co-ordinates of the region of interest, pixel values of the content in the region of interest, content in the region of interest, font and font size of the content in the region of interest, information about the overlapping background and foreground content are computed. These attributes include the masking/redaction information associated with the region of interest (sensitive data field). At block 410, cheque image templates corresponding to each standard cheque image are computed.

At block 412, an input cheque image which needs to be masked and one or more records containing values for one or more sensitive data fields are received. At block 414, similarity of the input cheque image with each of the cheque image templates is computed. On finding the matching cheque image template, it also gets to know about the associated metadata and the masking/redaction information associated with all the sensitive data fields on the cheque image. Based on the masking/redaction information, at block 416, image snippets of same dimension and attributes as that of the sensitive data fields are generated. The content for each of these image snippets is taken from the input data records. At block 418, the generated image snippets are overwritten in the cheque image template and the other portions of the input cheque image are remained to generate one or more masked cheque images.

In an implementation, one or more of the method(s) described herein may be implemented at least in part as instructions embodied in non-transitory computer-readable storage medium and executable by one or more computing devices. In general, a processor (for example a microprocessor) receives instructions, from a non-transitory computer-readable medium, for example, a memory, and executes those instructions, thereby performing one or more method(s), including one or more of the method(s) described herein. Such instructions may be stored and/or transmitted using any of a variety of known computer-readable media. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device.

The preceding description has been presented with reference to various embodiments. Persons having ordinary skill in the art and technology to which this application pertains appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method comprising:
  receiving, by one or more hardware processors, a cheque image and a data file, wherein the data file comprises data records with values corresponding to sensitive data fields in the cheque image;
  obtaining, by the one or more hardware processors, a template cheque image matching to the cheque image and redacted information associated with the template cheque image, wherein the redaction information comprises metadata information and information about sensitive fields and wherein the metadata information comprises memory space required by the template cheque image, dimensions, an image file format type, a compression scheme used to compress the template cheque image, a type of the template cheque image and a bit depth of the template cheque image;

generating, by the one or more hardware processors, a blank image snippet for each of the sensitive data fields in the cheque image based on the metadata information and at least a part of the obtained information about sensitive fields, wherein the at least a part of the obtained information about sensitive fields comprise co-ordinate information of the sensitive fields;

writing, by the one or more hardware processors, values corresponding to each of the sensitive fields from the data file to the blank image snippet based on remaining information about sensitive fields, wherein the remaining information about the sensitive fields comprises information associated with color, font, content, font size, and overlapping foreground and background content and wherein the color of the sensitive field is represented by a mean of pixel values used to represent content in the sensitive field;

updating, by the one or more hardware processors, the template cheque image with the image snippet, wherein updating comprises updating pixel values in the template cheque image to pixel values in the image snippet; and copying, by the one or more hardware processors, data of non-sensitive fields in the cheque image to the template cheque image, thereby facilitating cheque image data masking.

2. The method of claim 1, further comprising:
receiving a plurality of standard cheque images;
retrieving redaction information of each of the plurality of standard cheque images; and
generating template cheque images for the plurality of standard cheque images upon retrieving the redaction information.

3. The method of claim 2, wherein obtaining the template cheque image matching to the cheque image, comprises:
computing a distance between the cheque image and the templates cheque images; and
obtaining the template cheque image matching to the cheque image based on the computed distance.

4. The method of claim 1, further comprising:
comparing metadata information of the cheque image with the metadata information of the matching template cheque image; and
adjusting the template cheque image to resemble the cheque image when there are differences in the metadata information of the cheque image and the metadata information of the matching template cheque image.

5. A system comprising:
one or more memories; and
one or more hardware processors, the one or more memories coupled to the one or more hardware processors, wherein the one or more hardware processors are capable of executing programmed instructions stored in the one or more memories to:
receive a cheque image and a data file, wherein the data file comprises data records with values corresponding to sensitive data fields in the cheque image;
obtain a template cheque image matching to the cheque image and redacted information associated with the template cheque image, wherein the redaction information comprises metadata information and information about sensitive fields and wherein the metadata information comprises memory space required by the template cheque image, dimensions, an image file format type, a compression scheme used to compress the template cheque image, a type of the template cheque image and a bit depth of the template cheque image;

generate a blank image snippet for each of the sensitive data fields in the cheque image based on the metadata information and at least a part of the obtained information about sensitive fields, wherein the at least a part of the obtained information about sensitive fields comprise co-ordinate information of the sensitive fields;

write values corresponding to each of the sensitive fields from the data file to the blank image snippet based on remaining information about sensitive fields, wherein the remaining information about the sensitive fields comprises information associated with color, font, content, font size, and overlapping foreground and background content and wherein the color of the sensitive field is represented by a mean of pixel values used to represent content in the sensitive field;

update the template cheque image with the image snippet, wherein update comprises updating pixel values in the template cheque image to pixel values in the image snippet; and copy data of non-sensitive fields in the cheque image to the template cheque image, thereby facilitating cheque image data masking.

6. The system of claim 5, wherein the one or more hardware processors are further capable of executing programmed instructions to:
receive a plurality of standard cheque images;
retrieve redaction information of each of the plurality of standard cheque images; and
generate template cheque images for the plurality of standard cheque images upon retrieving the redaction information.

7. The system of claim 6, wherein the one or more hardware processors are further capable of executing programmed instructions to:
compute a distance between the cheque image and the templates cheque images; and
obtain the template cheque image matching to the cheque image based on the computed distance.

8. The system of claim 5, wherein the one or more hardware processors are further capable of executing programmed instructions to:
compare metadata information of the cheque image with the metadata information of the matching template cheque image; and
adjust the template cheque image to resemble the cheque image when there are differences in the metadata information of the cheque image and the metadata information of the matching template cheque image.

9. A non-transitory computer readable medium embodying a program executable in a computing device, said program comprising:
a program code for receiving a cheque image and a data file, wherein the data file comprises data records with values corresponding to sensitive data fields in the cheque image;

a program code for obtaining a template cheque image matching to the cheque image and redacted information associated with the template cheque image, wherein the redaction information comprises metadata information and information about sensitive fields and wherein the metadata information comprises memory space required by the template cheque image, dimensions, an image file format type, a compression scheme used to compress the template cheque image, a type of the template cheque image and a bit depth of the template cheque image;

a program code for generating a blank image snippet for each of the sensitive data fields in the cheque image based on the metadata information and at least a part of the obtained information about sensitive fields, wherein the at least a part of the obtained information about sensitive fields comprise co-ordinate information of the sensitive fields;

a program code for writing values corresponding to each of the sensitive fields from the data file to the blank image snippet based on remaining information about sensitive fields, wherein the remaining information about the sensitive fields comprises information associated with color, font, content, font size, and overlapping foreground and background content and wherein the color of the sensitive field is represented by a mean of pixel values used to represent content in the sensitive field;

a program code for updating the template cheque image with the image snippet, wherein updating comprises updating pixel values in the template cheque image to pixel values in the image snippet; and a program code for copying data of non-sensitive fields in the cheque image to the template cheque image, thereby facilitating cheque image data masking.

* * * * *